A. B. MUELLER.
CASING STRUCTURE.
APPLICATION FILED NOV. 7, 1917.
1,317,634.
Patented Sept. 30, 1919.
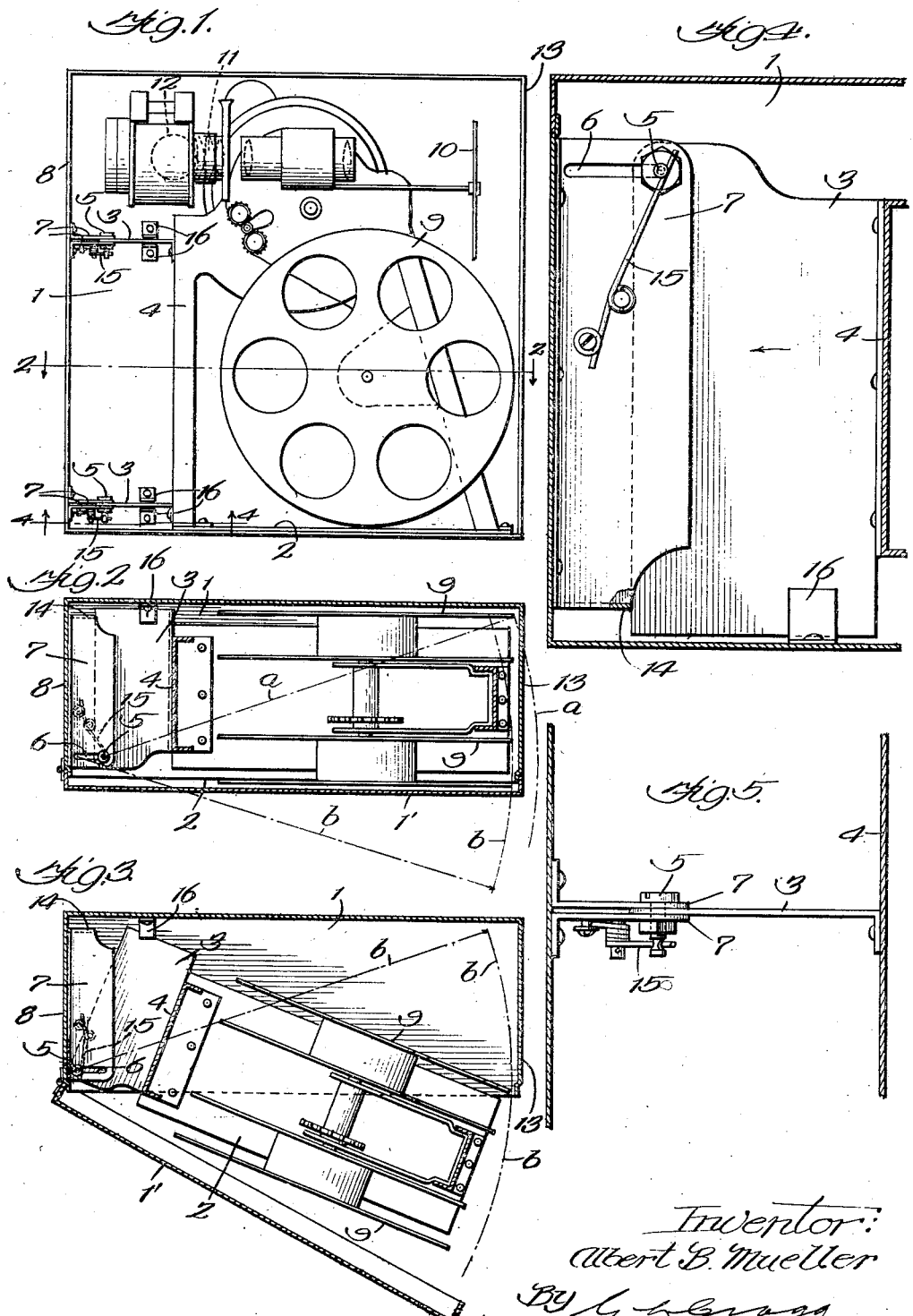
Inventor:
Albert B. Mueller

UNITED STATES PATENT OFFICE.

ALBERT B. MUELLER, OF CHICAGO, ILLINOIS.

CASING STRUCTURE.

1,317,634.

Specification of Letters Patent.

Patented Sept. 30, 1919.

Application filed November 7, 1917. Serial No. 200,683.

*To all whom it may concern:*

Be it known that I, ALBERT B. MUELLER, citizen of the United States, residing at Chicago, in the county of Cook and State of Illinois, have invented a certain new and useful Improvement in Casing Structures, of which the following is a full, clear, concise, and exact description.

My invention relates to casings having swingingly mounted supports for the incased objects that permit these objects to be swung into and out of the casings while assembled therewith.

In accordance with my invention a support is swingingly mounted adjacent a side of a casing and near the entrance opening and is shiftable at its mounting toward and away from said casing side so that when the object upon the support is to be swung from or toward the casing or the back thereof it may clear the side of the casing that is opposite the mounting for the support. By this arrangement the side of the casing that is opposite the mounting for the support may be brought closer to the side of the casing where such mounting is located whereby the size of the casing may be reduced from that which would otherwise be required.

I will explain my invention more fully by reference to the accompanying drawing showing the preferred embodiment thereof and in which Figure 1 is a front view of the casing minus the cover for the casing; Fig. 2 is a sectional-view on line 2—2 of Fig. 1 with a cover for the casing added; Fig. 3 is a view, somewhat similar to Fig. 2, except that the cover is shown slightly open and the support is shown as being swung forwardly to a partial extent; Fig. 4 is a view, on a larger scale, of a part of the structure as it appears in Fig. 2 but looking from beneath; and Fig. 5 is a view, on a larger scale, of a part of the structure as it appears in Fig. 1 but with certain portions shown in section instead of in elevation.

Like parts are indicated by similar characters of reference throughout the different figures.

The casing 1 has an entrance opening 2. The support for swingingly mounting an object within the casing is here shown as being inclusive of the supporting leaves 3, a connecting strut 4 and the alined and coaxial mounting pins 5 passing through the leaves 3. These pins 5 pass through slots 6 formed in brackets 7 and extending laterally away from the casing side 8 adjacent which such slots are disposed. These slots are adjacent the entrance opening 2. The place where the support, which is composed of the elements 3, 4 and 5, is swingingly mounted is upon the brackets 7 and at the slots 6 through which the pins 5 pass. The pins 5 are movable toward and from the casing side 8 so that it may be said that the support 3, 4, 5 is shiftable at its mounting toward and away from the side 8 of the casing. The direction in which the support is shiftable at its mounting toward and away from the casing side 8 is desirably laterally of such side, whereby the space between such casing side and the shifting plane parallel with the casing side, and which plane includes the shifting axis of the alined pins 5, varies, this space being widest when the support is swung to its inner position and being narrowest when swung to its outer position. I do not wish to be limited, however, to this arrangement for varying the space between the place where the support is swingingly mounted and the adjacent casing side 8. The object illustrated in the drawing as being carried by the support 3, 4, 5 is a motion picture projection apparatus which need not be described in detail but which, for the sake of clearly understanding my invention, is here mentioned as including film reels 9, a shutter 10, a lens structure 11 and a lamp housing 12, mention of these parts being sufficient to indicate the general nature of the projection apparatus illustrated.

It is desirable to remove the lamp housing 12 from the lens structure 11 while the projection apparatus is completely inclosed by the casing 1 on which account sufficient space must intervene between the casing side 8 and the adjacent end of the lamp housing 12. Because of the presence of the necessary space that intervenes between the casing side 8 and the lamp housing 12, I am enabled to make the casing of rectangular formation throughout and to project the slots 6 inwardly or laterally from the front portion of the casing side 8. When the projection apparatus is within the casing the place of mounting for the support is farthest from the casing side 8 and is nearest the casing side 13 that is opposite to and parallel with the casing side 8 (Figs. 2 and 4). The cover 1¹ may then be closed as illustrated in Fig. 2. If the pins 5 were normally held in the positions shown clearly in Figs. 2 and 4, the casing side 13 would have to be moved farther from the casing side 8 than shown in order that the rear reel structure 9 may clear the casing side 13. I am enabled to place the casing side 13 closer in, as illustrated, as the pins 5 are shifted to the left hand ends of the slots 6—Fig. 3 (when the projection apparatus is to be swung from the casing through the entrance opening 2) to enable the inner reel structure 9 to clear the casing side 13 which this reel structure would not do if the pins 5 remained in the positions shown in Figs. 2 and 4. The dot and dash lines $a$ indicate the interference that would exist between the rear reel structure 9 and the casing side 13 if the pivot pins 5 remained in the location shown in Fig. 2. The dot and dash lines $b$ indicate how interference is avoided when the fulcrum pins 5 are shifted to the left hand ends of the slots 6 as indicated in Fig. 3.

A fulcrum, jointly formed by the portions 14 of the brackets 7, is at the rear of the casing and adjacent the side 8 of the casing. The support is movable toward and from this fulcrum and is movable thereupon when the support is nearing its inner position (Fig. 3) to move the support at its mounting from the casing side 8 to bring the pins 5 to the right hand ends of the slots 6 to place the support in such position with respect to the casing that the lamp housing 12 may be moved to the left away from the lens structure 11 while the projection apparatus is completely within the casing. Springs 15 press upon the pins 5 and serve to shift the support at its mounting toward the casing side 8 as the support is moved outwardly from its inner position. When the projection apparatus is completely incased the leaves 3 of the support are received between the jaws of the clips 16, these clips coöperating with the pins 5 and the brackets 7 to hold the projection apparatus in firm position in the casing.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a casing having an entrance opening; of a support swingingly mounted adjacent a side of said casing and near said entrance opening to move toward and from said opening, the support being shiftable at its mounting toward and away from said side of the casing; a fulcrum at the rear of said casing and adjacent said side of the casing and toward and from which fulcrum the support is movable and upon which fulcrum the support turns when nearing its inner position to move the support at its mounting from said casing side; and spring means for shifting the support at its mounting toward said casing side as the support is moved outwardly from its inner position.

2. The combination with a casing having an entrance opening; of a support swingingly mounted adjacent a side of said casing and near said entrance opening to move toward and from said opening, the support being shiftable at its mounting toward and away from said side of the casing; and spring means for shifting the support at its mounting toward said casing side as the support is moved outwardly.

3. The combination with a casing having an entrance opening; of a support swingingly mounted adjacent a side of said casing and near said entrance opening to move toward and from said opening, the support being shiftable at its mounting toward and away from said side of the casing; and a fulcrum at the rear of said casing and adjacent said side of the casing and toward and from which fulcrum the support is movable and upon which fulcrum the support turns when nearing its inner position to move the support at its mounting from said casing side.

4. The combination with a casing having an entrance opening; of a support swingingly mounted adjacent a side of said casing and near said entrance opening to move toward and from said opening, the support being shiftable at its mounting toward and away from said side of the casing.

In witness whereof I hereunto subscribe my name this eighth day of October, A. D. 1917.

ALBERT B. MUELLER.